(12) United States Patent
Lefevre et al.

(10) Patent No.: US 9,239,430 B2
(45) Date of Patent: Jan. 19, 2016

(54) INTEGRATED OPTICAL CIRCUIT WITH TRAVERSING ATTENUATION ZONE

(71) Applicants: Herve Claude Lefevre, Paris (FR); Frederic Guattari, Aubervilliers (FR)

(72) Inventors: Herve Claude Lefevre, Paris (FR); Frederic Guattari, Aubervilliers (FR)

(73) Assignee: IXBLUE, Marly le Roi (FR)

( * ) Notice: Subject to any disclaimer, the term of this patent is extended or adjusted under 35 U.S.C. 154(b) by 0 days.

(21) Appl. No.: 14/372,768

(22) PCT Filed: Jan. 16, 2013

(86) PCT No.: PCT/FR2013/050101
§ 371 (c)(1),
(2) Date: Jul. 17, 2014

(87) PCT Pub. No.: WO2013/107984
PCT Pub. Date: Jul. 25, 2013

(65) Prior Publication Data
US 2014/0355932 A1    Dec. 4, 2014

(30) Foreign Application Priority Data

Jan. 19, 2012   (FR) ..................... 12 50549

(51) Int. Cl.
| | | |
|---|---|---|
| *G02B 6/12* | (2006.01) | |
| *G02B 6/26* | (2006.01) | |
| *G02B 6/125* | (2006.01) | |
| *G02B 6/122* | (2006.01) | |
| *G02B 6/126* | (2006.01) | |
| *G02B 6/30* | (2006.01) | |

(52) U.S. Cl.
CPC ..... *G02B 6/266* (2013.01); *G02B 6/12* (2013.01); *G02B 6/125* (2013.01); *G02B 6/122* (2013.01); *G02B 6/126* (2013.01); *G02B 6/30* (2013.01);

(Continued)

(58) Field of Classification Search
CPC .............. G02B 6/12; G02B 6/30; G02B 6/42; G02B 6/4214; G02B 6/43; G02B 6/125; G02B 6/12119
See application file for complete search history.

(56) References Cited

U.S. PATENT DOCUMENTS 5,475,772 A    12/1995 Hung et al.
5,999,667 A *  12/1999 Castoldi et al. .................. 385/2
(Continued)

FOREIGN PATENT DOCUMENTS

| EP | 0 806 685 | 11/1997 |
| EP | 1 111 413 | 6/2001 |
| EP | 1 396 741 | 3/2004 |

OTHER PUBLICATIONS

International Search Report dated Aug. 3, 2013, in corresponding PCT application.

*Primary Examiner* — Eric Wong
*Assistant Examiner* — Mary A El Shammaa
(74) *Attorney, Agent, or Firm* — Young & Thompson (57) ABSTRACT

An integrated optical circuit includes an optically transparent substrate including: an input face, an output face, an upper face and a lower face, the upper and lower faces extending between the input and output faces; at least one optical waveguide which includes at least one first end situated on the input face and a second end situated on the output face; and at least one optical attenuation zone able to attenuate an optical signal transmitted via the substrate to the outside of the waveguide. The waveguide has a non-rectilinear optical path between the first and second end, the attenuation zone extends from the upper face to the lower face, and is positioned on a straight line segment joining the first and second end of the optical waveguide, the waveguide and the attenuation zone having respective dimensions such that the attenuation zone does not cut the waveguide.

22 Claims, 7 Drawing Sheets

(52) U.S. Cl.
CPC ............. *G02B 2006/1215* (2013.01); *G02B 2006/12119* (2013.01); *G02B 2006/12126* (2013.01)

(56) References Cited

U.S. PATENT DOCUMENTS

| | | | |
|---|---|---|---|
| 6,212,307 B1 | 4/2001 | Labeye et al. | |
| 6,393,183 B1 * | 5/2002 | Worley | 385/39 |
| 6,480,639 B2 * | 11/2002 | Hashimoto et al. | 385/14 |
| 7,366,372 B2 | 4/2008 | Lange | |
| 2001/0031122 A1 * | 10/2001 | Lackritz et al. | 385/131 |
| 2006/0110089 A1 | 5/2006 | Ichikawa | |
| 2007/0212012 A1 * | 9/2007 | Hashizume et al. | 385/140 |
| 2009/0087133 A1 | 4/2009 | Lewis et al. | |
| 2009/0190876 A1 | 7/2009 | Doi | |
| 2013/0121632 A1 * | 5/2013 | Akutsu et al. | 385/11 |

* cited by examiner

INTEGRATED OPTICAL CIRCUIT WITH TRAVERSING ATTENUATION ZONE

BACKGROUND OF THE INVENTION

1. Field of the Invention

The present invention relates to an integrated optical circuit (also Integrated Optic Circuit) comprising a generally planar substrate and at least one optical waveguide. More precisely, the invention relates to an integrated optical circuit comprising means for attenuating the propagation of spurious optical waves via the substrate.

2. Description of the Related Art

The fabrication of integrated optical circuits is based on the use of microlithography techniques that allow a series production. A single-mode optical waveguide may be fabricated on a planar substrate by steps of masking and deposition of a narrow strip of material, possibly followed by a step of thermal diffusion. In an integrated optical circuit, as in an optical fiber, the optical guiding effect is linked to a difference of refractive index between the optical waveguide and the substrate, the refractive index of the waveguide being higher than that of the substrate. Different materials may be used for the fabrication of integrated optical circuits, such as III-V semiconductors, silica on silicon, glass, or also lithium niobate ($LiNbO_3$) or lithium tantalate ($LiTaO_3$). Lithium tantalate and lithium niobate are particularly interesting materials because they have a Pockels electro-optical effect. By placing electrodes on either side of the integrated waveguide, it is possible to modulate the waveguide index and then to modulate the phase of an optical signal propagating in the waveguide. In an integrated optical circuit where the electrodes are separated by about ten micrometers, the application of a voltage of only a few volts is sufficient to generate an electrical field and to induce the desired phase modulation. By way of comparison, in a conventional optic phase modulator, the electrodes being separated by at least one millimeter, the electric voltage required to generate a same electric field between the electrodes is of several hundreds of volts.

Different technologies of fabrication of integrated optical circuits on lithium niobate have been developed, firstly the titanium (Ti) diffusion technique, then the proton-exchange technique. The titanium diffusion technique consists in depositing a strip of titanium on the surface of a lithium niobate substrate, then to heat the substrate in such a manner that the titanium is diffused into the substrate and increases locally the refractive index. The titanium diffusion technique requires a high temperature (900-1100° C.). The proton-exchange technique consists in placing a birefringent $LiNbO_3$ crystal in a bath of acid so as to replace Li+ ions by H+ ions (i.e. protons). The proton-exchange technique is performed at a lower temperature than the titanium diffusion. Moreover, the technique of proton exchange on a birefringent $LiNbO_3$ crystal has for effect both to increase the extraordinary index of the crystal, which creates guidance for a polarization according to the extraordinary axis, and to reduce the ordinary index of the crystal, with the result that a polarization according to the ordinary axis is not guided. In the proton-exchange $LiNbO_3$ circuits, the common configuration is a section X, the axis X of the single-axis birefringent $LiNbO_3$ crystal being perpendicular to the surface of the substrate, whereas the axes Y and Z of the crystal are parallel to the surface. The axis of propagation of the waveguide is parallel to the direction Y, and the TE mode (where TE stands for "transverse electric", i.e. an electric field parallel to the surface of the substrate) is parallel to the direction Z. In this case, the proton-exchange optical waveguide guides only the TE polarization state, the TM cross-polarization state (where TM stands for "transverse magnetic", i.e. a magnetic field parallel to the surface of the substrate and thus an electric field perpendicular to the surface of the substrate) propagating freely in the substrate. The technique of proton exchange in lithium niobate hence allows to fabricate a polarizer on an integrated optical circuit.

Many integrated optical circuits are hence fabricated from lithium niobate: polarizer, phase modulator, Mach-Zehnder interferometer, Y-junction, 2×2 coupler or 3×3 coupler. Advantageously, a same optical circuit integrates several functions on a same substrate, which allows to improve the compactness and to reduce the optical connections. The integrated optical circuits obtained by lithium niobate proton-exchange find applications in particular in fiber optic gyroscopes.

In an integrated optical circuit, an input beam is generally coupled to an end of an optical waveguide through an optical fiber. However, only certain modes (for example, of polarization) are guided by the waveguide, the other modes propagating freely in the substrate. Moreover, if the core of the fiber is not perfectly aligned with the waveguide of the integrated optical circuit, a part of the incident light beam may be coupled in the substrate and may propagate outside the waveguide. A part of the light non guided by the waveguide may be reflected by total internal reflection on one or several faces of the substrate. In fine, a part of this non-guided light may be coupled to an output optical fiber facing to another end of the waveguide. The non-guided light may hence disturb the operation of an integrated optical circuit. For example, in the case of a lithium niobate proton-exchange polarizer, the polarization rejection rate may be affected by the coupling of the light transmitted in a non-guided manner by the substrate. Likewise, in the case of a 2×2 or 3×3 coupler, the non-guided light may be coupled via the substrate from an input to an output of the integrated optical circuit.

Figure 1:
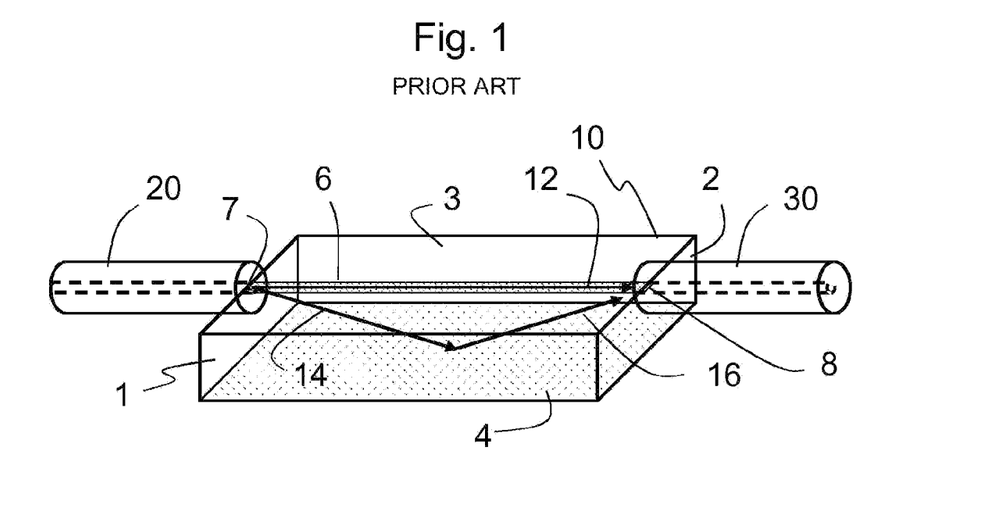
FIG. 1 schematically shows a perspective view of an integrated optical circuit according to the prior art.

FIG. 1 schematically shows a perspective view of an integrated optical circuit according to the prior art. The integrated optical circuit comprises a planar substrate 10. By convention, in the present disclosure, the substrate 10 comprises an input face 1, an output face 2, a lower face 4, an upper face 3 and two lateral faces 5. The lower face 4 and the upper face 3 extend between the input face 1 and the output face 2. The lower face 4 and the upper face 3 are opposite to each other. Preferably, the lower face 4 and the upper face 3 are planar and parallel to each other. Likewise, the lateral faces 5 are planar and parallel to each other and extend between the input face 1 and the output face 2. The input 1 and output 2 faces of the substrate may also be planar and polished, but are preferably cut with an angle of inclination to avoid the spurious reflections between the ends of the waveguide. The substrate 10 comprises a rectilinear optical waveguide 6 that extends between a first end 7 on the input face 1 and a second end 8 on the output face 2. By convention, the waveguide 6 is nearer from the upper face 3 than from the lower face 4. According to a preferred embodiment, the optical waveguide 6 is located under the upper face 3 of the substrate and extends in a plane parallel to the upper face 3. The optical waveguide 6 may be delimited by the upper face or buried just under this upper face. In other embodiments, the waveguide 6 may be deposited on the upper surface 3 or may extend inside the substrate, for example in a plane parallel to the upper surface 3, half the way between the lower face 4 and the upper face 3. An input optical fiber 20 and an output optical fiber 30 are optically coupled to the first end 7 and respectively to the second end 8 of the waveguide 6. The input optical fiber 20 transmits an optical beam in the integrated optical circuit. A part of the optical beam is guided by the waveguide. The guided beam 12 propagates up to the end 8 of the waveguide 6 facing the output fiber 30. Due to a mode mismatching between the core of the optical fiber 20 and the integrated waveguide 6, another part of the beam is not coupled in the waveguide and propagates freely in the substrate 10. A non-guided beam 14 then propagates in the substrate up to the lower face 4 of the substrate. A part of the non-guided beam 14 may be reflected by total internal reflection on the lower face 4. A part of the reflected beam 16 may then be transmitted up to the end of the substrate facing the output fiber 30. The output fiber 30 may hence collect not only the guided optical beam 12, but also a part of the non-guided and reflected optical beam 16. FIG. 1 shows only a single reflection on the lower face 4 of the substrate, half the way between the input face 1 and the output face 2, i.e. at the centre of the lower face 4. Other multiple internal reflections are also possible.

Figure 2:
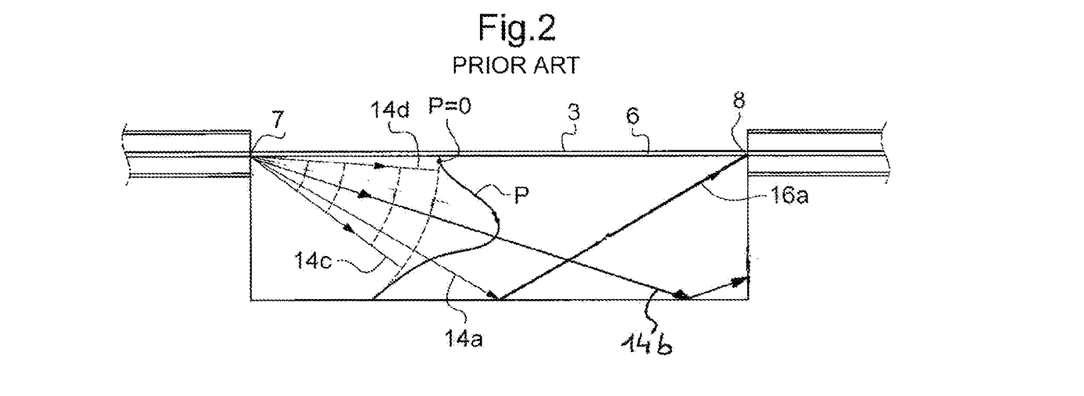
FIG. 2 schematically shows the angular distribution of the light power in a non-guided optical beam in an integrated optical circuit such as that of FIG. 1, seen in sectional view.

FIG. 2 shows a sectional view of the integrated optical circuit of FIG. 1 in which has been schematically shown the angular distribution of the light power of the non-guided optical beam in the substrate. It is observed that a relatively high part of the optical beam is optically coupled in the substrate. The non-guided optical wave undergoes a total internal reflection on the upper surface 3. Therefore, the non-guided optical wave is subjected to an interferometric effect of the Lloyd mirror type on the upper face 3 of the substrate. This results in a Lloyd-mirror interferometer, interferences being produced between the input fiber 20 and its virtual image. Now, the total internal reflection produces a phase-shift of π. Consequently, the central fringe of the interferogram, located on the upper face 3, is a black fringe. This explains that the power density of the non-guided light propagating directly is drastically reduced just under the upper face 3, where is placed the output optical fiber (cf. H. Lefèvre, The fiber optic gyroscope, Artech House, 1992, Annex 3 Basics of Integrated Optics, pp. 273-284). Consequently, a proton-exchange polarizer would have in theory a very high polarization rate of −80 to −90 dB.

However, there exist other types of coupling of the non-guided optical beam than direct transmission. Indeed, the substrate may transmit different non-guided beams propagating by internal reflection, in particular on the lower face 4, but also on the upper face 3 or on the lateral faces 5. Non-guided spurious beams propagating by internal reflection on the faces of the substrate may reach the proximity of a waveguide end 8 on the output face 2 of the substrate.

Generally, the non-guided beams reflected inside the substrate may affect the quality of the signals transmitted in the waveguide of an integrated optical circuit. In the case of a lithium niobate proton-exchange polarizer, cut according to a plane X and comprising a waveguide integrated according to the axis of propagation Y, the guided beam 12 is generally a TE polarisation beam and the non-guided beam 14 is a TM polarisation beam. Due to the internal reflections of non-guided light in the substrate, the polarisation rejection rate of a proton-exchange polarizer according to the diagram of FIG. 1 is in practice limited to about −50 dB. Now, the quality of an integrated polarizer influences the performances of certain applications, in particular in a fiber optic gyroscope. It is hence necessary to improve the rejection rate of an integrated optical guide polarizer. More generally, it is desirable to improve the optical quality of an integrated optical circuit and to reduce the quantity of non-guided spurious light transmitted by the substrate outside the optical waveguide.

Different solutions have been proposed to solve the problem of spurious coupling of non-guided optical beams between a waveguide input and a waveguide output in an integrated optical circuit.

It is generally admitted that the main contribution to the spurious light comes from the primary reflection of a non-guided beam on the centre of the lower face 4 between a first waveguide end 7 on the input face 1 and a second waveguide end 8 on the output face 2. In order to eliminate the primary reflection on the lower face of a substrate 4, an integrated optical circuit comprising a central groove 25*a* arranged in the middle of the lower face 4 (cf. FIG. 3) has been developed. The central groove 25*a* extends over the whole width of the substrate according to a direction perpendicular to the direction of the waveguide 6. However, if a central groove 25*a* stops the non-guided beam 14*a* that is reflected at the centre of the lower face 4 of the substrate, it does not stop the multiple internal reflections produced between the lower face 4 and the upper face 3. FIG. 4 shows an example of a part of non-guided optical beam 14*b* propagating between a first waveguide end 7 and a second waveguide end 8, by double reflection on the lower face and simple reflection of the upper face to form a multiple-reflection spurious beam 16*b*. Therefore, a central groove on the lower face of the substrate allows to improve the rejection rate of a proton-exchange polarizer by several orders of magnitude, but the rejection rate remains limited in practice to about −65 dB.

The document EP1111413 describes an IOC comprising at least one central groove extending over more than 70% of the thickness of the substrate and a lid to reinforce the structure so as to avoid a breaking of the IOC at the central groove.

Figure 5:
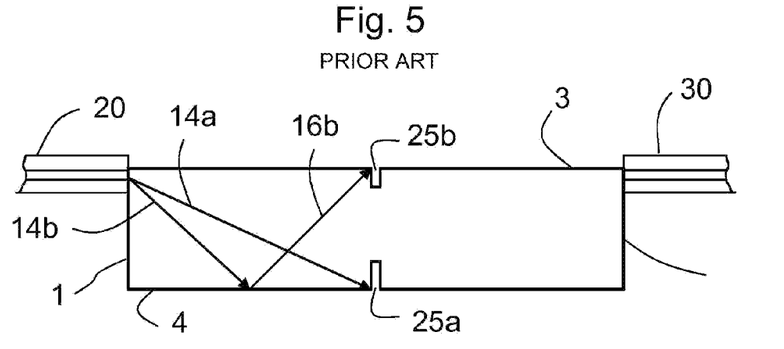
FIG. 5 schematically shows a sectional view of a Y-junction comprising a groove on the lower face and a groove on the upper face according to the prior art.

In the case of a Y-junction, the U.S. Pat. No. 7,366,372 proposes to arrange a first central groove 25*a* on the lower face of the integrated optical circuit, half the way between the input face 1 and the output face 2, so as to eliminate the primary reflection, and a second central groove 25*b* on the upper face, arranged between the branches of the Y-junction, and half the way between the input face and the output face, so as to eliminate the part of the non-guided beam 14*b* propagating by multiple reflection in the substrate and reflecting on the middle of the upper face (see the sectional view in FIG. 5). However, the central groove 25*b* on the upper face 3 must not cut the waveguide 6 and is thus laterally limited so as not to cut the branches of the Y-junction. This solution is not generalizable to other types of integrated optical circuits.

The document EP1396741 describes an IOC comprising a waveguide formed in a thin layer sandwiched between two confinement layers, the three-layer structure being integrated on a substrate. The document EP1396741 also describes a groove extending in the thickness of the three layers and approaching the nearest possible to the waveguide to absorb the spurious light.

BRIEF SUMMARY OF THE INVENTION

The invention aims to propose an alternative or complementary solution to the formation of an absorbing central groove on the lower face of an optical integrated circuit. More precisely, one of the objects of the invention is to propose an integrated optical circuit that is robust while allowing to reduce the rate of transmission of non-guided spurious light in the substrate. Another object of the invention is to reduce the rate of spurious coupling (cross-coupling) between input ports and output ports, in an optical integrated circuit having several input ports and/or several output ports.

The present invention has for object to remedy the drawbacks of the prior devices and relates more particularly to an integrated optical circuit comprising an optically transparent substrate, said substrate comprising an input face, an output face, two lateral faces, a lower face and an upper face, said lower face and upper face extending between the input face and the output face, the upper face being planar and opposite to the lower face; at least one optical waveguide located in a plane parallel to the upper face, at least one first waveguide end located on the input face of the substrate and at least one second waveguide end located on the output face of the substrate; and at least one optical attenuation zone able to attenuate an optical beam transmitted via the substrate in a non-guided manner by said optical waveguide.

According to the invention, said at least one waveguide has a non-rectilinear optical path between said at least one first waveguide end and said at least one second waveguide end. Being defined a straight line segment between said at least one first waveguide end and said at least one second waveguide end, said at least one attenuation zone extends inside the substrate from the lower face to the upper face of the substrate, said at least one attenuation zone being positioned on said straight line segment so as to attenuate a non-guided optical beam transmitted via the substrate between said first waveguide end and said second waveguide end, said at least one waveguide and said at least one attenuation zone having respective dimensions such that said at least one attenuation zone does not cut said waveguide.

According to a preferred embodiment of the invention:
said at least one optical attenuation zone comprises at least one through-hole extending from the lower face to the upper face of the substrate;
said at least one through-hole is filled with an optically absorbing or opaque material or with a reflective material.

According to a particular embodiment of the invention, said at least one attenuation zone is positioned in the middle of said straight line segment joining a first waveguide end on the input face of the integrated optical circuit and a second waveguide end on the output face of the integrated optical circuit.

According to a preferred aspect of an embodiment of the invention, the waveguide is able to guide an optical beam having a first determined state of polarization, referred to as guided, and to transmit in the substrate a non-guided optical beam having a second state of polarization.

According to a preferred aspect of an embodiment of the invention, the substrate is consisted of a material chosen among $LiNbO_3$ and $LiTaO_3$.

According to a particular embodiment of the invention, said at least one attenuation zone has such dimensions that a straight line passing through said first waveguide end and tangent to said at least one attenuation zone has a point of intersection with the output face located at a minimum distance x from said second waveguide end, such that the distance x is higher than or equal to:

$$\sqrt{\frac{D\lambda}{2}}$$

where D is the distance between said attenuation zone and said point of intersection, and $\lambda$ is the wavelength in the material of said non-guided optical beam.

According to a particular embodiment of the invention, the IOC further includes at least one groove on the lower face of the integrated optical circuit, one groove on the upper face of the integrated optical circuit, and/or one groove on the lateral face of the integrated optical circuit.

According to a particular embodiment of the invention, said at least one optical waveguide comprises a common branch, a first secondary branch and a second secondary branch, the common branch being connected by a Y-junction to the first secondary branch and to the second secondary branch and said at least one attenuation zone is arranged on a first straight line segment joining the first end of the common branch on the input face to the second end of the first secondary branch on the output face and/or on a second straight line segment joining the first end of the common branch on the input face to the second end of the second secondary branch on the output face.

According to an aspect of this particular embodiment, said at least one attenuation zone comprises at least one first attenuation zone and at least one second attenuation zone, said first attenuation zone being arranged on a first straight line segment joining the first end of the common branch on the input face to the second end of the first secondary branch on the output face and said second attenuation zone being arranged on a second straight line segment joining the first end of the common branch on the input face to the second end of the second secondary branch on the output face.

According to another aspect of this particular embodiment, the first attenuation zone and the second attenuation zone are arranged respectively on either side of the common branch of the Y-junction.

According to a particular embodiment of the invention, said substrate comprises N optical waveguides, with N an integer higher than or equal to two, having at least N waveguide ends on the input face and/or at least N waveguide ends on the output face and said at least one attenuation zone comprises at least N distinct attenuation zones, each distinct attenuation zone being arranged on a straight line segment joining a waveguide end on the input face and a waveguide end on the output face.

According to a particular embodiment of the invention, said substrate comprises at least one additional attenuation zone extending inside the substrate from the lower face to the upper face of the substrate, said at least one additional attenuation zone being positioned in such a manner to attenuate a non-guided optical beam following an optical path comprising a reflection on a lateral face and a reflection on the lower face between said first waveguide end and said second waveguide end.

The invention will find a particularly advantageous application in a proton-exchange polarizer on a lithium niobate substrate.

The present invention also relates to the characteristics that will be revealed by the following description and that will have to be considered in isolation or according to all their technically possible combinations.

BRIEF DESCRIPTION OF THE DRAWINGS

The invention will be better understood and other objects, details, characteristics and advantages of it will appear more clearly when reading the description of one (several) particular embodiment(s) of the invention given only by way of illustrative and non-limitative example with reference to the appended drawings. In these drawings:

FIG. 14A schematically shows a top view of an integrated optical circuit according to a variant of the first embodiment of the invention and FIG. 14B a side view of the output face of the integrated optical circuit of FIG. 14A;

DETAILED DESCRIPTION OF THE PREFERRED EMBODIMENTS

Figure 3:
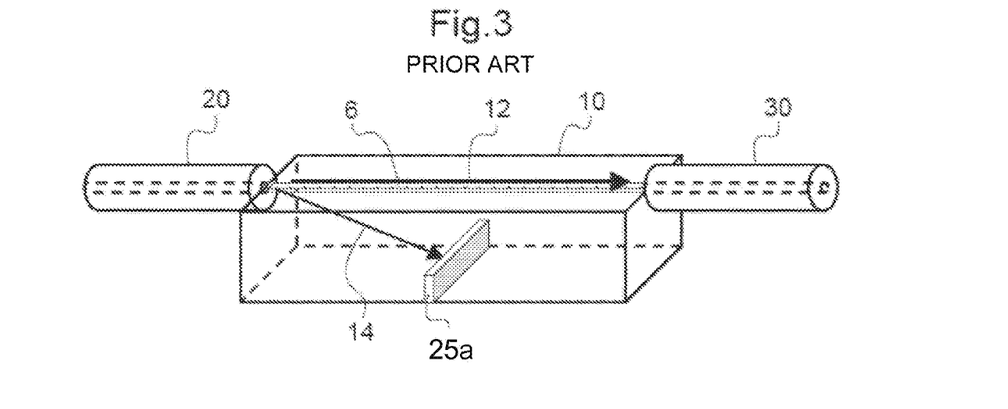
FIG. 3 schematically shows a perspective view of an integrated optical circuit comprising a central groove according to the prior art.
Figure 4:
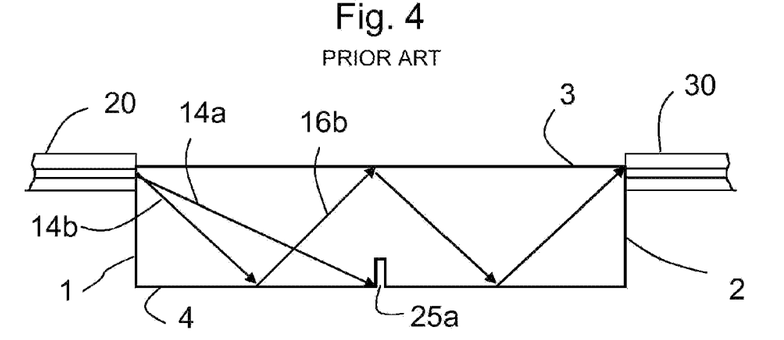
FIG. 4 schematically shows the propagation of a part of the non-guided optical beam in an integrated optical circuit having a central groove on the lower face according to the prior art.
Figure 6:
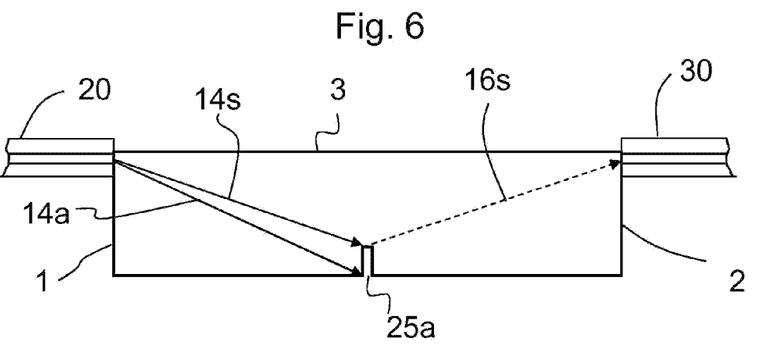
FIG. 6 schematically shows a sectional view of an integrated optical circuit comprising a central groove on the lower face and a spurious beam of specular reflection on the central groove.
Figure 7:
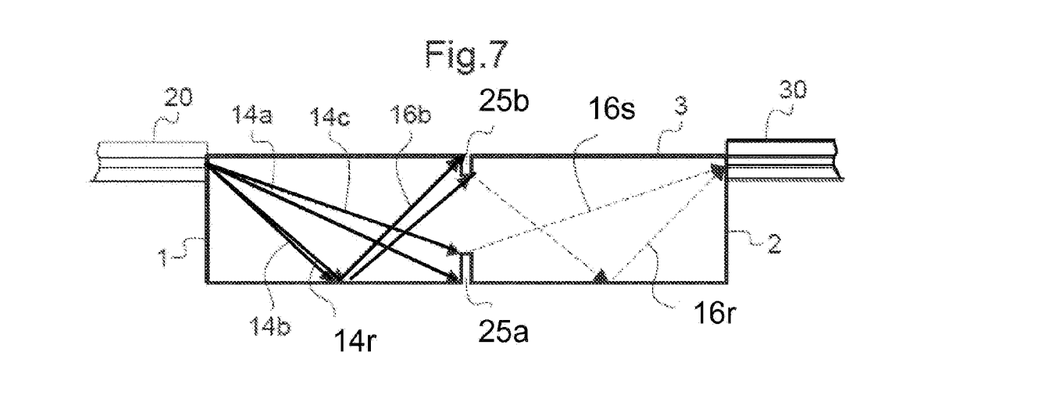
FIG. 7 schematically shows a sectional view of an integrated optical circuit comprising a central groove on the lower face, a central groove on the upper face and spurious beams of specular reflection on the two central grooves.
Figure 8:
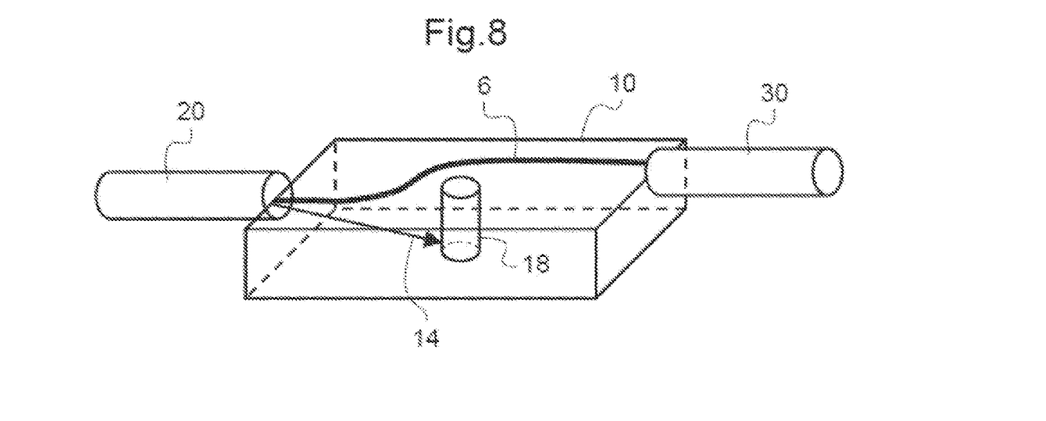
FIG. 8 schematically shows a perspective view of an integrated optical circuit according to a first embodiment of the invention.

An observation belonging to the present invention is that, in an integrated circuit comprising a central groove 25a, as shown in FIGS. 3 and 4, a residual fraction of spurious light may nevertheless be optically coupled between a first waveguide end 7 on the input face 1 and a second waveguide end 8 on the output face 2. Indeed, a part of the non-guided light beam 14s may form a spurious beam by specular reflection 16s on the bottom of the central groove 25a on the lower face (cf. FIG. 6). A part of the non-guided beam 14s may be reflected on the bottom of a groove 25a even when this groove is polished or filled with an absorbing material. Likewise, in the case of a Y-junction comprising a central groove 25a on the lower face 4 and a central groove 25b on the upper face 3, another part of the non-guided light beam 14r may also form a spurious beam by specular reflection 16r on the bottom of the central groove 25b on the upper face of the substrate towards the output face of the integrated optical circuit (cf. FIG. 7). Due to the symmetry of the device relative to the central groove, the angle of the specular reflection on the bottom of the central groove produces a reflected beam 16s and/or 16r that is directed towards the second end 8 of the waveguide 6. By symmetry, the beams 16s and 16r are hence coupled in the core of the output optical fiber 30. It results from the present analysis that the contribution of the spurious light by specular reflection on the bottom of a groove is by no means negligible.

Based on this analysis, FIGS. 8-11A schematically show different views of an integrated optical circuit according to a first embodiment of the invention. The integrated optical circuit comprises a substrate 10 comprising an input face 1, an output face 2, a lower face 4, an upper face 3, two lateral faces 5 and an optical waveguide 6. A first end 7 of the optical waveguide 6 is located on the input face 1 of the substrate and a second end 8 of the optical waveguide 6 is located on the output face 2 of the substrate 10. The waveguide 6 of the device shown in FIGS. 8-11A has the distinctive characteristic not to be rectilinear. In other words, the optical path of the waveguide 6 does not follow a straight line between the first end 7 on the input face 1 and the second end 8 of the output face 2. According to the embodiment shown in FIGS. 8-11A, the optical path of the waveguide 6 is consisted of a continuous curved line located in a plane parallel to the upper surface 3. Preferably, the curvature radii of the waveguide 6 are the greatest possible so as to allow a good guidance of the guided optical beam 12 and to minimize the optical losses. According to another embodiment, the optical path of the waveguide 6 may be consisted of curvilinear segments and/or straight line segments connected in series to each other.

The optical integrated circuit of FIGS. 8-11A also comprises an attenuation zone 18. As it appears in FIG. 9, the attenuation zone 18 is located on a straight line segment 9 joining the first end 7 of the waveguide on the input face 1 to the second end 8 of the waveguide on the output face 2. It is observed in FIG. 10, in sectional view, that the attenuation zone 18 extends inside the substrate from the lower face 4 of the substrate to the upper face 3 of the substrate. In the considered example, the waveguide 6 is located just bellow the upper face. However, the extent of the attenuation zone 18 is delimited laterally in such manner not to cut the optical path of the waveguide 6. The attenuation zone 18 does not reach either the lateral faces 5 of the substrate. In other words, the optical path of the waveguide 6 bypasses the attenuation zone 18. Due to the fact that the optical path of the waveguide 6 is not rectilinear, the attenuation zone 18 does not cut the optical path of the guided optical path. A guided optical beam 12 thus follows the optical path of the waveguide from the input face 1 to the output face 2. On the other hand, a non-guided optical beam 14, that travels along a rectilinear optical path in a plane containing the first end 7 of the waveguide and the second end 8 of the waveguide, said plane being perpendicular to the lower face 4 of the substrate, is intercepted by the attenuation zone 18. As it appears in FIG. 10, the attenuation zone 18 intercepts not only the primary reflection 14a between the first end 7 and the second end 8, but also all the part of the non-guided beam that is transmitted 14c or reflected 16b by multiple internal reflection inside the substrate between the upper face 3 and the lower face 4 in a plane passing by the two ends 7 and 8. More generally, the attenuation zone also intercepts the spurious beams transmitted via the substrate in an angular sector of shadow 19 having for apex the first end 7 of the waveguide on the input face 1 and having for generating line the straight lines 15a, 15b passing through the first end 7 and tangent to the attenuation zone 18 (cf. FIG. 9).

A single attenuation zone 18 advantageously allows to intercept not only the main reflection 14a, 16a at the centre of the lower face of the substrate, but also all the multiple internal reflections between the two ends of the waveguide. It is not essential to form several attenuation zones to eliminate the different internal reflections.

The configuration of the attenuation zone 18, which extends inside the substrate from the lower face 4 to the upper face 3 of the integrated optical circuit also allows to attenuate the spurious optical beams that propagate in the substrate with a very small angle of inclination relative to the upper face 3. Therefore, the attenuation zone 18 allows to stop a part of spurious light that would be reflected on the bottom of a groove of the prior art. The attenuation zone 18 of the invention hence allows to obtain an improvement of the rejection rate of the non-guided spurious light in an integrated optical circuit. In the case of a lithium niobate proton-exchange polarizer, the attenuation zone 18 according to the invention allows to improve the polarization rejection rate of the polarizer and to approach the theoretical value of the extinction rate.

According to a preferred embodiment, the attenuation zone 18 is materialized by a through-hole between the upper face 3 and the lower face 4 of the substrate 10. According to the embodiment shown in FIGS. 8-11A, the attenuation zone is cylindrical in shape and has an axis transverse to the straight line segment 9 joining the first, input, end 7 to the second, output, end 8 of the waveguide 6. Advantageously, the cylindrical attenuation zone 18 is of circular or oblong section. Advantageously, the attenuation zone is located about the middle point of the straight line segment 9 joining the first end 7 to the second end 8. As an alternative, the attenuation zone 18 may have a truncated shape, or a parallelepipedal shape, or any another shape, geometrical or not.

Advantageously, a through-hole 18 may be filled with an optically absorbing or opaque or reflecting material. According to various alternatives, the walls of the attenuation zone 18 may have a treatment so as to modify the diffusion, the diffraction and/or the absorption of the non-guided spurious light 14.

It is observed that the main reflection zone on the lower face of the substrate for a given couple of input-output fibers is almost punctual, this zone being located on the direct path between the input and the output and half the way between the input fiber 20 and the output fiber 30. The spatial extent of the attenuation zone 18 may thus be limited laterally around this central zone. However, spurious light beams propagating in the substrate undergo a so-called "screen edge" Fresnel diffraction on the edges of the attenuation zone 18 and a part of these diffracted beams is liable to be coupled in the output fiber 30.

Figure 11A:
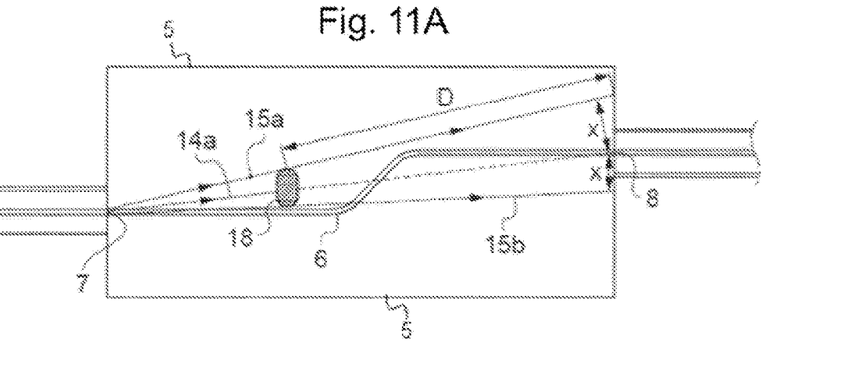
FIG. 11A is a top view of an integrated optical circuit according to a variant of the first embodiment of the invention.
Figure 11B:
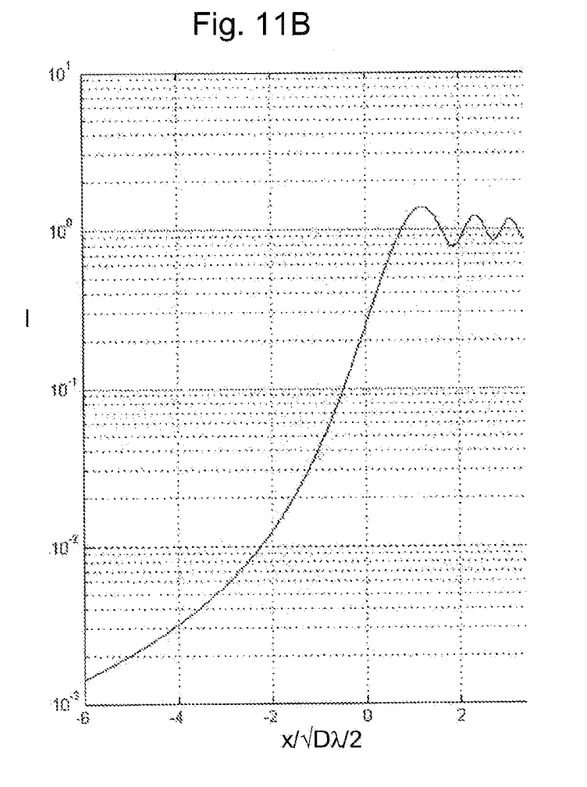
FIG. 11B shows a diagram of normalized intensity diffracted by a screen edge as a function of a normalized abscissa.

The phenomena of diffraction on the edge of a groove are generally not taken into account in the documents of the state of the art. Now, the cone of shadow 19 includes on each of its edges a half-shadow zone, where the intensity of the diffracted light is not negligible. It is observed that this half-shadow zone is relatively extended even when considered in near-field condition, at small distance from the diffracting edge. FIG. 11B shows a diagram of normalized intensity diffracted by a screen edge as a function of a normalized abscissa. A screen is considered, which extends in a half-plane whose edge is located at an abscissa x=0. In FIG. 11B is represented the normalized intensity of the light diffracted by the screen edge at a distance D from the plane of the screen as a function of a normalized abscissa. A normalized abscissa of 1 corresponds to a distance $$x = \sqrt{\frac{D\lambda}{2}}.$$

More precisely, interest is taken to the intensity of the diffracted light in the half-shadow zone (x<0), in near field. It is observed in FIG. 11B that the normalized intensity decreases slowly in the half-shadow zone. The normalized intensity remains higher than $10^{-2}$ for an normalized abscissa x equal to −2. The light diffracted on the edge(s) of an attenuation zone 18 or a groove is similar to a near-field screen-edge diffraction. The intensity of the diffracted light generates spurious light at a small distance D from the edge on which the light is diffracted.

In order to limit this spurious diffraction effect, the dimensions of the attenuation zone and the position thereof on the straight line segment 9 joining the first waveguide end 7 and the second waveguide end 8 are preferably chosen as follows. Being defined the straight lines 15a and 15b respectively tangent to an edge of the attenuation zone and passing through the first waveguide end 7 on the input face 1 (cf. FIG. 11A). Let's denote x the smallest distance between the second waveguide end 8 and the tangent straight line 15a or the tangent straight line 15b. Let's denote D the distance between a point tangent to the attenuation zone 18 and the output face 2 along the tangent straight line 15a or 15b, the nearest from the end 8. In other words, D represents the distance between said attenuation zone and the point of intersection of the tangent straight line 15a or 15b on the output face 2. The spatial extent of the attenuation zone in a direction transverse to the straight line segment 9 is determined so that the distance x is higher than or equal to:

$$\sqrt{\frac{D\lambda}{2}}$$

where λ is the wavelength in the material of said non-guided optical beam in the substrate. That way, the wave diffracted by the edges of the attenuation zone 18 is attenuated enough not to disturb the beam collected at the second end 8. As shown in FIG. 11A, the hole 18 may have an oval or oblong shape. Let's take the case of a lithium niobate substrate having a length L of 50 mm, where the attenuation zone 18 is placed at the centre, D is equal to 25 mm. For a beam having a wavelength in vacuum of 1.55 μm, the refractive index for the non-guided beam in the substrate is equal to 2.2 and the wavelength λ in the material is equal to 0.7 μm. The minimum distance x is then equal to 93 μm. In this case, the edges of the attenuation zone are preferably located at at least about fifty micrometers from the straight line 9 joining the first end 7 and the second end 8 of the waveguide so as to limit the effects of the diffraction on the edges of the attenuation zone.

Figure 12:
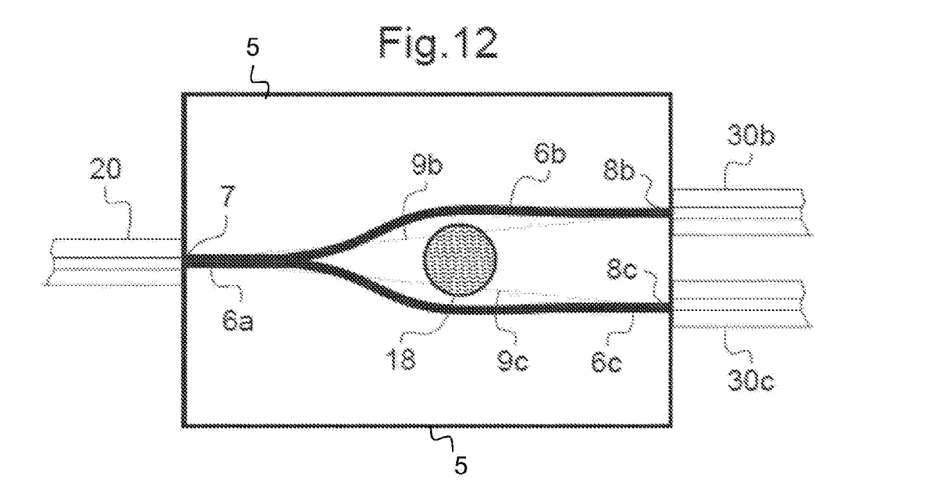
FIG. 12 schematically shows a top view of a Y-junction integrated optical circuit according to a variant of the first embodiment of the invention.
Figure 13:
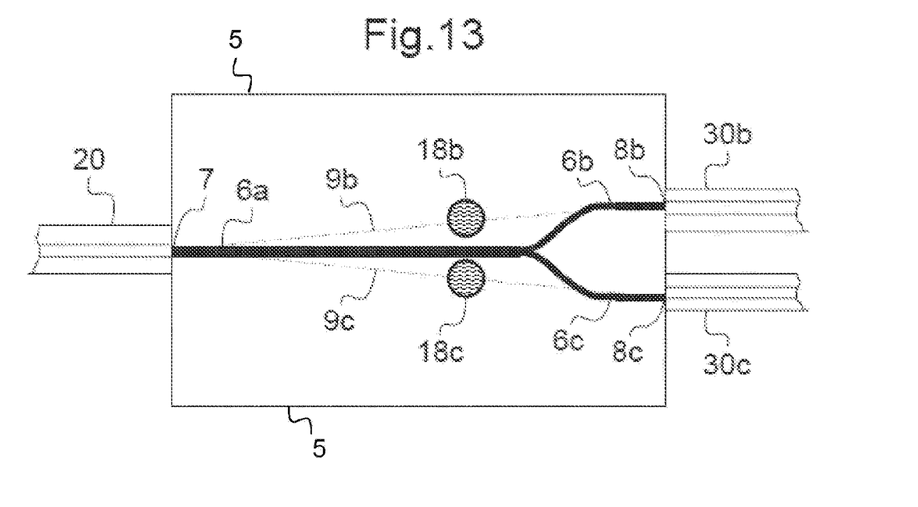
FIG. 13 schematically shows a top view of a Y-junction integrated optical circuit according to a second embodiment of the invention.

FIGS. 12 and 13 schematically show, in top view, various embodiments of integrated optical circuits of the Y-junction type. In these various embodiments, the optical waveguide comprises a common branch 6a, a first secondary branch 6b and a second secondary branch 6c. The common branch 6a is connected to the secondary branches 6b, 6c by a junction. A first end 7 of the common branch 6a is located on the input face 1 of the substrate. A second end 8b, respectively 8c, of each of the secondary branches 6*b* and 6*c* is located on the output face 2. An input fiber 20 is placed opposite the first end 7 of the common branch 6*a* on the input face 1. A first output fiber 30*b* is placed opposite the second end 8*b* of the first secondary branch 6*b* on the output face 2 and a second output fiber 30*c* is placed opposite the second end 8*c* of the second secondary branch 6*c* on the output face 2. The straight line segments 9*b* and 9*c* respectively joining the first end 7 of the common branch 6*a* of the waveguide on the input face 1 to the second ends 8*b*, respectively 8*c*, of the secondary branches 6*b*, respectively 6*c*, on the output face 2 are represented in FIGS. 12 and 13 by dotted lines, respectively 9*b* and 9*c*. As can be observed on FIG. 12, the secondary branches 6*b*, 6*c* deviate from the straight line segments 9*b* and 9*c*.

According to the embodiment shown in FIG. 12, the Y-junction integrated optical circuit comprises a single attenuation zone 18. As in the first embodiment, the attenuation zone 18 extends from the lower face 4 of the substrate to the upper face 3 of the substrate, below which is located the waveguide 6*a*, 6*b*, 6*c*. As can be observed in FIG. 12, the attenuation zone 18 extends transversally both on the straight line segment 9*b* joining the end 7 of the common branch 6*a* on the input face 1 to the end 8*b* of the first secondary branch 6*b* on the output face 2 and on the straight line segment 9*c* joining the end 7 of the common branch 6*a* on the input face 1 to the end 8*c* of the second secondary branch 6*c* on the output face 2. However, the attenuation zone 18 cuts neither the common branch 6*a* nor the first secondary branch 6*b* nor the second secondary branch 6*c*. In other words, the two secondary branches 6*b*, 6*c* of the waveguide bypass the attenuation zone 18. Advantageously, the attenuation zone 18 of FIG. 12 may be made by means of a through-hole, circular or oblong in shape, provided between the secondary branches 6*a* and 6*b* of the Y-junction. Similarly to the first embodiment, the attenuation zone may be filled with an optically absorbing, reflecting, diffracting and/or diffusing material. Taking again the preceding numerical application for a lithium niobate substrate having a length L of 50 mm, where the attenuation zone 18 is placed in the centre, D is equal to 25 mm. For a beam having a wavelength in vacuum of 1.55 μm, the minimum distance x is then equal to 93 μm as denoted above. For a distance between the ends 8*b* and 8*c* of 800 μm and a hole 18 of transverse dimension equal to 700 μm, the half-shadow zone extends over 300/93, i.e. a normalized distance $$x = -3.2 \times \sqrt{\frac{D\lambda}{2}}.$$

With reference to FIG. 11B, it can be deduced an attenuation of the order of $5.10^{-3}$ or −23 dB.

According to another embodiment shown in FIG. 13, the Y-junction integrated optical circuit comprises two distinct attenuation zones 18*b* and 18*c*. Similarly to the previous embodiments, the attenuation zones 18*b* and 18*c* extend from the upper face 3 to the lower face 4 of the substrate 10. A first attenuation zone 18*b* is arranged on the straight line segment 9*b* joining the end 7 of the common branch 6*a* on the input face 1 to the end 8*b* of the first secondary branch 6*b* on the output face 2. A second attenuation zone 18*c* is arranged on the straight line segment 9*c* joining the first end 7 of the common branch 6*a* on the input face 1 to the second end 8*c* of the second secondary branch 6*c* of the output face 2. The attenuation zones 18*b* and 18*c* may be formed by through-holes possibly filled with an absorbing material. Unlike the embodiment described in relation with FIG. 12, according to the embodiment of FIG. 13, the attenuation zones 18*b* and 18*c* are arranged outside the secondary branches 6*b* and 6*c*. It is observed in FIG. 13 that the attenuation zones 18*b* and 18*c* are arranged on either side of the common branch 6*a* of the Y-junction.

In the case of an integrated optical circuit with several branches, such as a Y-junction, the most advantageous place for the attenuation zone(s) depends on the length of the common branch relative to the distance separating the input face and the output face, as well as the separating distance between the secondary branches. The optimal place for an attenuation zone of course also depends on the shape of the non-rectilinear optical path between two ends of the waveguide.

Figure 9:
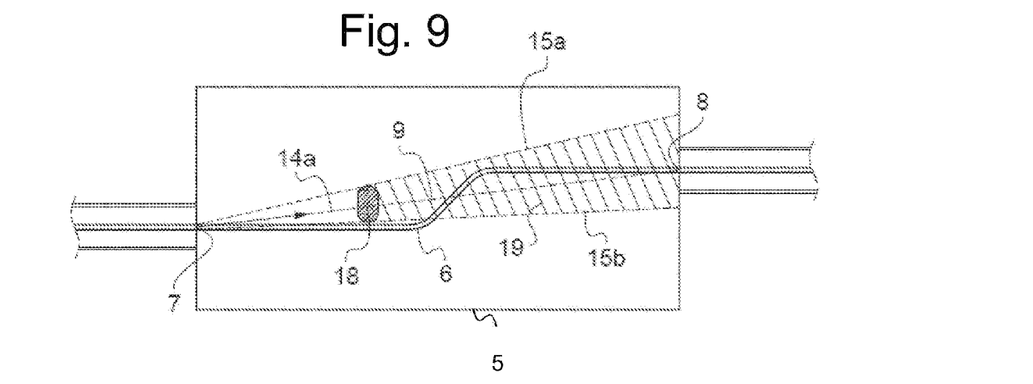
FIG. 9 schematically shows a top view of an integrated optical circuit according to a first embodiment of the invention.
Figure 10:
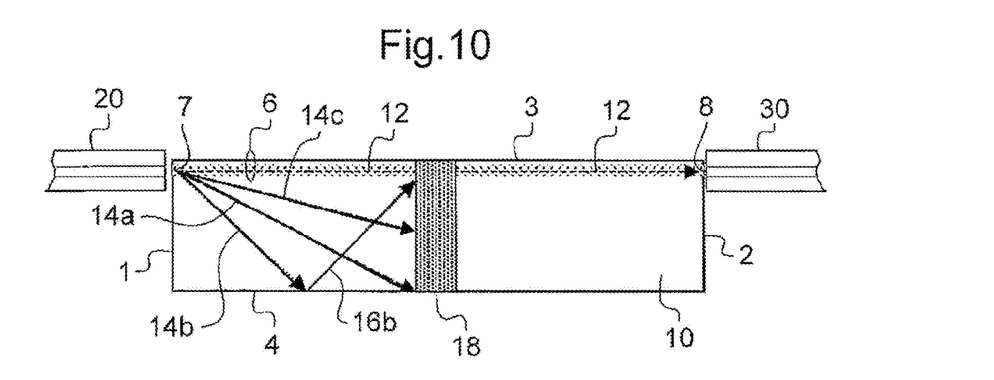
FIG. 10 schematically shows a sectional view of an integrated optical circuit according to the first embodiment of the invention.
Figure 16:
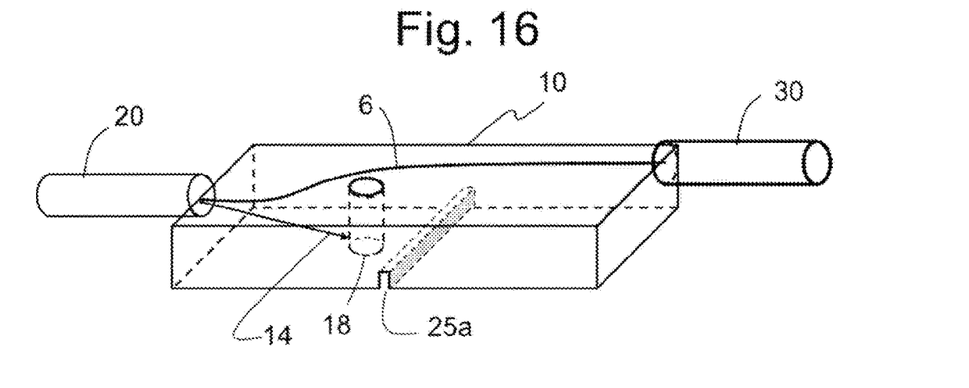
FIG. 16 schematically shows a perspective view of an integrated optical circuit according to a first variant of the first embodiment.

FIG. 16 illustrates a variant of the embodiment of FIG. 9, in which an IOC includes an attenuation zone 18 and, in a complementary manner, a central groove 25*a* on the lower face of the substrate. The attenuation zone 18 fulfils the conditions of the half-shadow zone indicated above. Hence, the attenuation zone 18 has for effect to attenuate the spurious internal reflections propagating directly between the first waveguide end 7 and the second waveguide end 8, as well as to avoid that the half-shadow zone corresponding to the light diffracted on the edges of this attenuation zone 18 reaches the second waveguide end 30. As a supplement to this attenuation zone 18, the central groove 25*a* allows to further attenuate the spurious beams of residual half-shadow propagating in the substrate. The supplementary attenuation of the spurious beams provided by the central groove 25*a* allows to further improve the extinction rate in a waveguide polarizer. The combination of these elements allows to reach a rejection rate of about −80 dB. Other grooves, for example on the upper face 3, or off-centred grooves on the lower face, may also supplement the IOC to improve the rejection of spurious light. The one skilled in the art will easily adapt the device of the invention to an optical integrated circuit comprising more than one input branch and/or more than two output branches, such as a 1×N coupler, a 2×2 coupler or a 3×3 coupler. For example, in the case of a coupler having one common input branch and N secondary output branches, it may be provided a number lower than or equal to N distinct attenuation zones.

Figure 14:
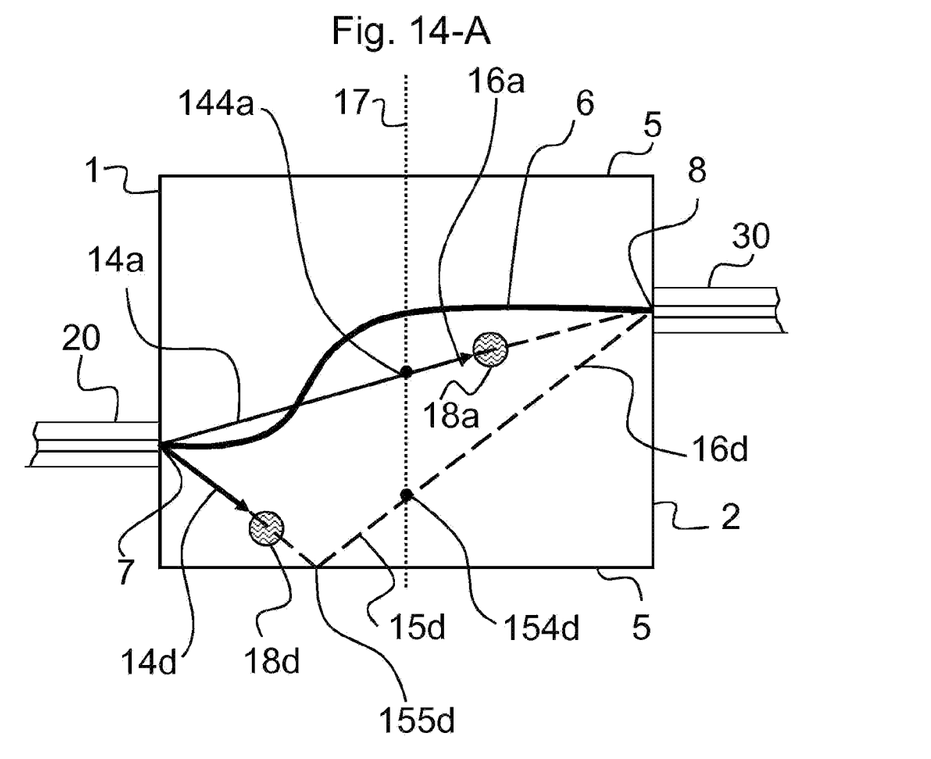

An integrated optical circuit according to a variant of the first embodiment is shown in top view in FIG. 14A and in side view in FIG. 14B (viewed from the output face 2). The integrated optical circuit comprises a non-rectilinear waveguide 6, extending between a first end 7 coupled to an input optical fiber 20 and a second end 8 coupled to an output optical fiber 30. The integrated optical circuit comprises a first attenuation zone 18*a* and a second attenuation zone 18*d*. Similarly to the previous embodiments, the attenuation zones 18*a* and 18*d* extend from the upper face 3 to the lower face 4 of the substrate 10. The first attenuation zone 18*a* is arranged on a straight line segment joining the first end 7 of the waveguide on the input face 1 and the second end 8 of the waveguide on the output face 2. The optical path of the waveguide 6 bypasses the first attenuation zone 18*a*. A non-guided optical beam 14*a* is directed along a rectilinear optical path in a plane containing the first end 7 of the waveguide and the second end 8 of the waveguide. The non-guided optical beam 14*a* is reflected by total internal reflection on the lower face 4 of the integrated optical circuit at one point 144*a* located in the median plane 17, half the way between the input face 1 and the output face 2. The reflected beam 16*a* propagates in a plane perpendicular to the lower face 4 and passing through the ends 7 and 8 of the waveguide 6. The reflected beam 16*a* is hence intercepted by the attenuation zone 18*a*. The effect of the attenuation zone 18*a* is similar to that of the attenuation zone 18 of FIG. 8. FIGS. 14-A and 14-B also show another non-guided optical beam 14d coming from the end 7 of the waveguide. The non-guided beam 14d is liable to reach the second end of the waveguide after double reflection on a lateral face 5 on the substrate and on the lower face 4 of the substrate. Indeed, the non-guided beam 14d is incident on a lateral face 5 in one point 155d and forms a first reflected beam 15d. In the absence of the attenuation zone 18d, the reflected beam 15d would be reflected on the lower face at the point 154d also located on the median plane 17. The thus-formed doubly reflected beam 16d would be liable to reach the second end 8 of the waveguide 6. The effect of the second attenuation zone 18d is to intercept the beam 14d liable to form a spurious beam 16d by double reflection on the faces of the substrate. The integrated optical circuit of FIGS. 14-A and 14-B allows not only to attenuate a spurious beam 14a, 16a propagating by simple reflection on the lower face of the substrate but also allows to attenuate the spurious light 16d coming from a double internal reflection on a lateral face and on the lower face of the substrate.

Figure 15:
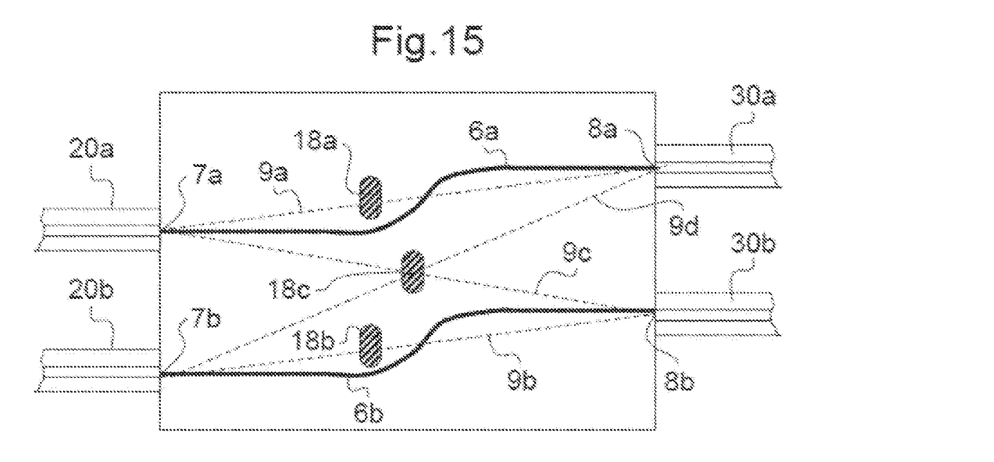
FIG. 15 schematically shows a top view of an integrated optical circuit according to another embodiment of the invention.

The invention also applies to an integrated optical circuit comprising several independent waveguides. FIG. 15 shows an integrated optical circuit including two independent waveguides 6a and 6b. Each waveguide 6a, respectively 6b, comprises a first end 7a, respectively 7b, on the input face 1, and comprises a second end 8a, respectively 8b, on the output face 2. As described in relation with the previous embodiments, a first attenuation zone 18a is arranged on the straight line segment 9a joining the first end 7a of the first waveguide 6a to the second end 8a of the first waveguide 6a. Likewise, a second attenuation zone 18b is arranged on the straight line segment 9b joining the first end 7b of the second waveguide 6b to the second end 8b of the second waveguide 6b. In order to avoid the spurious coupling between the first and the second waveguide, another attenuation zone 18c is further provided on the straight line segment 9c joining the first end 7a of the first waveguide 6a to the second end 8b of the second waveguide 6b. As shown in FIG. 15, the attenuation zone 18c is advantageously also located on the straight line segment 9d joining the first end 7b of the second waveguide 6b to the second end 8a of the first waveguide 6a. This embodiment allows to reduce the spurious coupling (cross-coupling) between the ends of different waveguides arranged on a same substrate. This scheme is easy to generalize to an integrated optical circuit comprising more than two waveguides or comprising different functions integrated on a same substrate, such as polarizer, phase modulator, Mach-Zehnder interferometer, Y-junction, 2×2 couplers or also 3×3 coupler.

According to a particular aspect, the substrate further comprises at least one groove arranged on one of the lateral, lower or upper faces of the substrate.

The invention advantageously applies to a proton-exchange polarizer on LiNbO$_3$ substrate.

The invention may be implemented right from the fabrication of an integrated optical circuit. The attenuation zone may be created in the substrate before or after the fabrication of the integrated waveguide, by microlithography methods (masking and etching) or by other physical-chemical methods (laser machining or ultrasonic drilling).

The invention also applies to existing integrated optical circuits. Indeed, it is very easy to modify an existing integrated optical circuit to form therein one or several attenuation zones as defined according to the present invention. For example, one or several through-holes may be formed in an integrated optical circuit, without inducing perturbation in a pre-existing optical waveguide. It is therefore possible to reduce considerably the rate of spurious light transmitted via an integrated optical circuit in a non-guided manner. In particular, it is therefore possible to improve the rejection rate of a pre-existing proton-exchange polarizer.

The invention allows to attenuate the propagation of non-guided spurious optical waves via the substrate. The attenuation zone makes impossible the direct reflections between the input fiber and the output fiber. Moreover, the attenuation zone does not risk to generate new spurious beams unlike a groove, because the attenuation zone extends in continuous from the lower face 4 to the upper face 3 of the substrate.

In the case of an integrated circuit having a waveguide with a single branch, the invention allows, by mean of a single attenuation zone, a better attenuation of non-guided spurious light, compared to a prior integrated optical circuit including a central groove.

The implementation of the invention allows to increase the integration on an integrated optical circuit while reducing the spurious coupling between inputs and output of one or several optical waveguides integrated on a same planar substrate.

The invention claimed is:

1. An integrated optical circuit comprising:
   an optically transparent substrate comprising:
      an input face, an output face, two lateral faces, a lower face, and an upper face, said lower face and said upper face extending between the input face and the output face, the upper face being planar and opposite to the lower face,
   at least one optical waveguide located in a plane parallel to the upper face,
   at least one first waveguide end located on the input face of the substrate and at least one second waveguide end located on the output face of the substrate, and
   at least one optical attenuation zone configured to attenuate an optical beam transmitted via the substrate in a non-guided manner by said optical waveguide,
   wherein said at least one waveguide has a non-rectilinear optical path between said at least one first waveguide end and said at least one second waveguide end,
   a straight line segment is defined between said at least one first waveguide end and said at least one second waveguide end, said at least one attenuation zone extending inside the substrate from the lower face to the upper face of the substrate, said at least one attenuation zone being positioned on said straight line segment so as to attenuate a non-guided optical beam transmitted via the substrate between said first waveguide end and said second waveguide end,
   said at least one waveguide and said at least one attenuation zone have respective dimensions such that said at least one attenuation zone does not cut said waveguide, and
   said at least one attenuation zone has such dimensions that a straight line passing through said first waveguide end and tangent to said at least one attenuation zone has a point of intersection with the output face located at a minimum distance x from said second waveguide end, such that the distance x is higher than or equal to:

$$\sqrt{\frac{D\lambda}{2}}$$

where D is the distance between said attenuation zone and said point of intersection, and λ is the wavelength in the material of said non-guided optical beam.

2. The integrated optical circuit according to claim 1, wherein said at least one optical attenuation zone comprises at least one through-hole extending from the lower face to the upper face of the substrate.

3. The integrated optical circuit according to claim 2, wherein said at least one through-hole is filled with an optically absorbing or opaque material or a reflective material.

4. The integrated optical circuit according to claim 1, wherein said at least one optical attenuation zone is positioned in the middle of said straight line segment joining a first waveguide end on the input face of the integrated optical circuit and a second waveguide end on the output face of the integrated optical circuit.

5. The integrated optical circuit according to claim 1, wherein said at least one waveguide is configured to guide an optical beam having a first, guided, determined state of polarization and to transmit in the substrate a non-guided optical beam having a second state of polarization.

6. The integrated optical circuit according to claim 1, further comprising at least one first groove on the lower face of the integrated optical circuit, one second groove on the upper face of the integrated optical circuit, and/or one third groove on the lateral face of the integrated optical circuit.

7. The integrated optical circuit according to claim 1, wherein said at least one optical waveguide comprises a common branch, a first secondary branch, and a second secondary branch, the common branch being connected by a Y-junction to the first secondary branch and to the second secondary branch, said at least one attenuation zone being arranged on a first straight line segment joining the first end of the common branch on the input face to the second end of the first secondary branch on the output face and/or on a second straight line segment joining the first end of the common branch on the input face to the second end of the second secondary branch on the output face.

8. The integrated optical circuit according to claim 7, wherein said at least one attenuation zone comprises at least one first attenuation zone and at least one second attenuation zone, said first attenuation zone being arranged on a first straight line segment joining the first end of the common branch on the input face to the second end of the first secondary branch on the output face and said second attenuation zone being arranged on a second straight line segment joining the first end of the common branch on the input face to the second end of the second secondary branch on the output face.

9. The integrated optical circuit according to claim 8, wherein said first attenuation zone and said second attenuation zone are arranged respectively on either side of the common branch of the Y-junction.

10. The integrated optical circuit according to claim 1, wherein said substrate comprises N optical waveguides N being an integer higher than or equal to two, having at least N waveguide ends on the input face and/or at least N waveguide ends on the output face, and said at least one attenuation zone comprises at least N distinct attenuation zones, each distinct attenuation zone being arranged on a straight line segment joining a waveguide end on the input face and a waveguide end on the output face.

11. The integrated optical circuit according to claim 1, wherein said substrate comprises at least one additional attenuation zone extending inside the substrate from the lower face to the upper face of the substrate, said at least one additional attenuation zone being positioned in such a manner to attenuate a non-guided optical beam following an optical path comprising a reflection on a lateral face and a reflection on the lower face between said first waveguide end and said second waveguide end.

12. An integrated optical circuit comprising:
an optically transparent substrate comprising:
an input face, an output face, two lateral faces, a lower face, and an upper face, said lower face and said upper face extending between the input face and the output face, the upper face being planar and opposite to the lower face,
at least one optical waveguide located in a plane parallel to the upper face,
at least one first waveguide end located on the input face of the substrate and at least one second waveguide end located on the output face of the substrate, and
at least one optical attenuation zone configured to attenuate an optical beam transmitted via the substrate in a non-guided manner by said optical waveguide,
wherein said at least one waveguide has a non-rectilinear optical path between said at least one first waveguide end and said at least one second waveguide end,
a straight line segment is defined between said at least one first waveguide end and said at least one second waveguide end, said at least one attenuation zone extending inside the substrate from the lower face to the upper face of the substrate, said at least one attenuation zone being positioned on said straight line segment so as to attenuate a non-guided optical beam transmitted via the substrate between said first waveguide end and said second waveguide end,
said at least one waveguide and said at least one attenuation zone have respective dimensions such that said at least one attenuation zone does not cut said waveguide, and
wherein said substrate comprises at least one additional attenuation zone extending inside the substrate from the lower face to the upper face of the substrate, said at least one additional attenuation zone being positioned in such a manner to attenuate a non-guided optical beam following an optical path comprising a reflection on a lateral face and a reflection on the lower face between said first waveguide end and said second waveguide end.

13. The integrated optical circuit according to claim 12, wherein said at least one optical attenuation zone comprises at least one through-hole extending from the lower face to the upper face of the substrate.

14. The integrated optical circuit according to claim 13, wherein said at least one through-hole is filled with an optically absorbing or opaque material or a reflective material.

15. The integrated optical circuit according to claim 12, wherein said at least one optical attenuation zone is positioned in the middle of said straight line segment joining a first waveguide end on the input face of the integrated optical circuit and a second waveguide end on the output face of the integrated optical circuit.

16. The integrated optical circuit according to claim 12, wherein said at least one waveguide is configured to guide an optical beam having a first, guided, determined state of polarization and to transmit in the substrate a non-guided optical beam having a second state of polarization.

17. The integrated optical circuit according to claim 12, wherein said at least one attenuation zone has such dimensions that a straight line passing through said first waveguide end and tangent to said at least one attenuation zone has a point of intersection with the output face located at a minimum distance x from said second waveguide end, such that the distance x is higher than or equal to:

$$\sqrt{\frac{D\lambda}{2}}$$

where D is the distance between said attenuation zone and said point of intersection, and λ is the wavelength in the material of said non-guided optical beam.

18. The integrated optical circuit according to claim 12, further comprising at least one first groove on the lower face of the integrated optical circuit, one second groove on the upper face of the integrated optical circuit, and/or one third groove on the lateral face of the integrated optical circuit.

19. The integrated optical circuit according to claim 12, wherein said at least one optical waveguide comprises a common branch, a first secondary branch, and a second secondary branch, the common branch being connected by a Y-junction to the first secondary branch and to the second secondary branch, said at least one attenuation zone being arranged on a first straight line segment joining the first end of the common branch on the input face to the second end of the first secondary branch on the output face and/or on a second straight line segment joining the first end of the common branch on the input face to the second end of the second secondary branch on the output face.

20. The integrated optical circuit according to claim 19, wherein said at least one attenuation zone comprises at least one first attenuation zone and at least one second attenuation zone, said first attenuation zone being arranged on a first straight line segment joining the first end of the common branch on the input face to the second end of the first secondary branch on the output face and said second attenuation zone being arranged on a second straight line segment joining the first end of the common branch on the input face to the second end of the second secondary branch on the output face.

21. The integrated optical circuit according to claim 20, wherein said first attenuation zone and said second attenuation zone are arranged respectively on either side of the common branch of the Y-junction.

22. The integrated optical circuit according to claim 12, wherein said substrate comprises N optical waveguides, N being an integer higher than or equal to two, having at least N waveguide ends on the input face and/or at least N waveguide ends on the output face, and said at least one attenuation zone comprises at least N distinct attenuation zones, each distinct attenuation zone being arranged on a straight line segment joining a waveguide end on the input face and a waveguide end on the output face.

* * * * *